United States Patent
Otake et al.

(10) Patent No.: US 11,654,896 B2
(45) Date of Patent: May 23, 2023

(54) VEHICLE CONTROL DEVICE

(71) Applicant: HONDA MOTOR CO., LTD., Tokyo (JP)

(72) Inventors: Hideharu Otake, Wako (JP); Yuki Nakada, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 177 days.

(21) Appl. No.: 17/204,239

(22) Filed: Mar. 17, 2021

(65) Prior Publication Data
US 2021/0291810 A1 Sep. 23, 2021

(30) Foreign Application Priority Data
Mar. 18, 2020 (JP) .............................. JP2020-047372

(51) Int. Cl.
*B60W 30/06* (2006.01)
*B60W 10/20* (2006.01)
*B60W 10/04* (2006.01)
*G01C 21/34* (2006.01)

(52) U.S. Cl.
CPC ............ *B60W 30/06* (2013.01); *B60W 10/04* (2013.01); *B60W 10/20* (2013.01); *G01C 21/3407* (2013.01)

(58) Field of Classification Search
CPC ...... B60W 30/06; B60W 10/04; B60W 10/20; B60W 2420/42; B60W 2420/52; B60W 2420/54; G01C 21/3407; B62D 15/0285; B62D 15/028

USPC .......................................................... 701/25
See application file for complete search history.

(56) References Cited

U.S. PATENT DOCUMENTS

| 11,485,354 | B2* | 11/2022 | Hayakawa | .............. B60R 21/00 |
| 2012/0097471 | A1* | 4/2012 | Sakamaki | ............ B62D 15/027 |
| | | | | 180/421 |
| 2019/0001968 | A1* | 1/2019 | Yorifuji | .............. B62D 15/0285 |
| 2019/0233009 | A1* | 8/2019 | Joos | ....................... G05D 1/0223 |
| 2020/0001864 | A1* | 1/2020 | Oyama | .................. B60W 10/18 |
| 2020/0218249 | A1* | 7/2020 | Sannodo | .................. B62D 1/00 |
| 2020/0346639 | A1* | 11/2020 | Tashiro | .................. G01C 21/34 |
| 2021/0061263 | A1* | 3/2021 | Inaba | ..................... B60W 30/06 |
| 2021/0146915 | A1* | 5/2021 | Niewiadomski | .......... G06T 7/13 |

FOREIGN PATENT DOCUMENTS

JP   H02-227370 A   9/1990

* cited by examiner

*Primary Examiner* — Jonathan M Dager
*Assistant Examiner* — Jean W Charleston
(74) *Attorney, Agent, or Firm* — Carrier Shende & Associates, P.C.; Joseph P. Carrier; Jeffrey T. Gedeon (57) ABSTRACT

A steering motor generates a driving force based on a steering instruction from a travel control unit and applies a steering axial force to a rack shaft to thereby cause vehicle wheels to be steered. An action planning unit, through the travel control unit, initiates traveling at a starting position of parking on a movement path by suppressing the steering axial force to be less than a maximum driving force of the steering motor.

5 Claims, 7 Drawing Sheets

FIG. 6A
COMPARATIVE EXAMPLE

VEHICLE CONTROL DEVICE

CROSS-REFERENCE TO RELATED APPLICATION

This application is based upon and claims the benefit of priority from Japanese Patent Application No. 2020-047372 filed on Mar. 18, 2020, the contents of which are incorporated herein by reference.

BACKGROUND OF THE INVENTION

Field of the Invention

The present invention relates to a vehicle control device that generates a movement path by which a user's own vehicle is automatically caused to be parked inside a parking space based on outputs of external environment sensors provided in the user's own vehicle.

Description of the Related Art

Power steering devices are in widespread use, which apply a thrust (axial force) to a rack shaft by rotation of a steering motor in accordance with a steering angle caused by operation of a steering wheel, and which impart a steering angle (turning angle) to the vehicle wheels to thereby change the direction of the vehicle wheels (tires).

In such an electric power steering device, a concern arises in that friction from shoulder portions of the tires increases at a time of stationary steering while the vehicle remains in a stopped state (full steering during vehicle stoppage), and as a result of the steering motor consuming a large amount of power, the performance of the steering motor deteriorates in the case of a steering motor having a small rating.

For example, in Japanese Laid-Open Patent Publication No. 2-227370 (hereinafter referred to as JP1990-227370A), a technique is disclosed for preventing a steering motor from burning out, by setting a command current to the steering motor to be zero when the vehicle is stopped, so that stationary steering is rendered impossible (see page 7, last line of upper left column, to third line of upper right column of JP1990-227370A).

SUMMARY OF THE INVENTION

Generally, when garaging is performed (for example, when a vehicle is caused to be parked in a U-shaped parking space as viewed in plan), the vehicle is advanced and stopped at a position (starting position of parking) on a rearward trajectory that enables fitting into a parking space with a minimum turning radius of the rear wheels of the vehicle.

Conventionally, the front wheels perform stationary steering (full steering when the vehicle is stopped) in a manner so that the front wheels are turned at a maximum steering angle at the starting position of parking, and then rearward parking of the vehicle is carried out.

By generating such a movement path, it is possible to carry out so-called garaging on the movement path in which forward movement and rearward movement can be completed only one time.

With such a conventional automated parking technique, which requires a stationary steering operation when the vehicle is stopped (full steering when the vehicle is stopped), at the time of full steering when the vehicle is stopped, a steering motor with a large rating (with a large maximum driving force of the main shaft) has been required.

However, a steering motor having a large rating has a problem in that the motor is large and heavy, and the motor consumes a large amount of electric power.

The present invention has been devised taking into consideration the aforementioned problems, and has the object of providing a vehicle control device which is capable of carrying out automated parking using a steering motor having a small rating.

A vehicle control device according to one aspect of the present invention is configured to cause a user's own vehicle to be automatically parked inside a parking space, based on outputs of external environment sensors provided in the user's own vehicle, the vehicle control device comprising a parking space selection unit configured to select the parking space, an action planning unit configured to generate a movement path for parking from a starting position of parking to a position inside the selected parking space, and a travel control unit configured to control a propulsion device and a steering motor along the generated movement path, wherein the steering motor generates a driving force based on a steering instruction from the travel control unit and applies a steering axial force to a rack shaft to thereby cause vehicle wheels to be steered, and the action planning unit generates the movement path to cause the user's own vehicle to initiate traveling by the steering motor at the starting position of parking and with a steering axial force less than a full steering axial force.

According to the one aspect of the present invention, since the vehicle is made to initiate traveling without stationary steering (full steering during vehicle stoppage), automated parking can be carried out with a steering motor having a small rating.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE PREFERRED EMBODIMENTS

Preferred embodiments of a vehicle control device according to the present invention will be presented and described in detail below with reference to the accompanying drawings.

EMBODIMENT

Configuration

Figure 1:
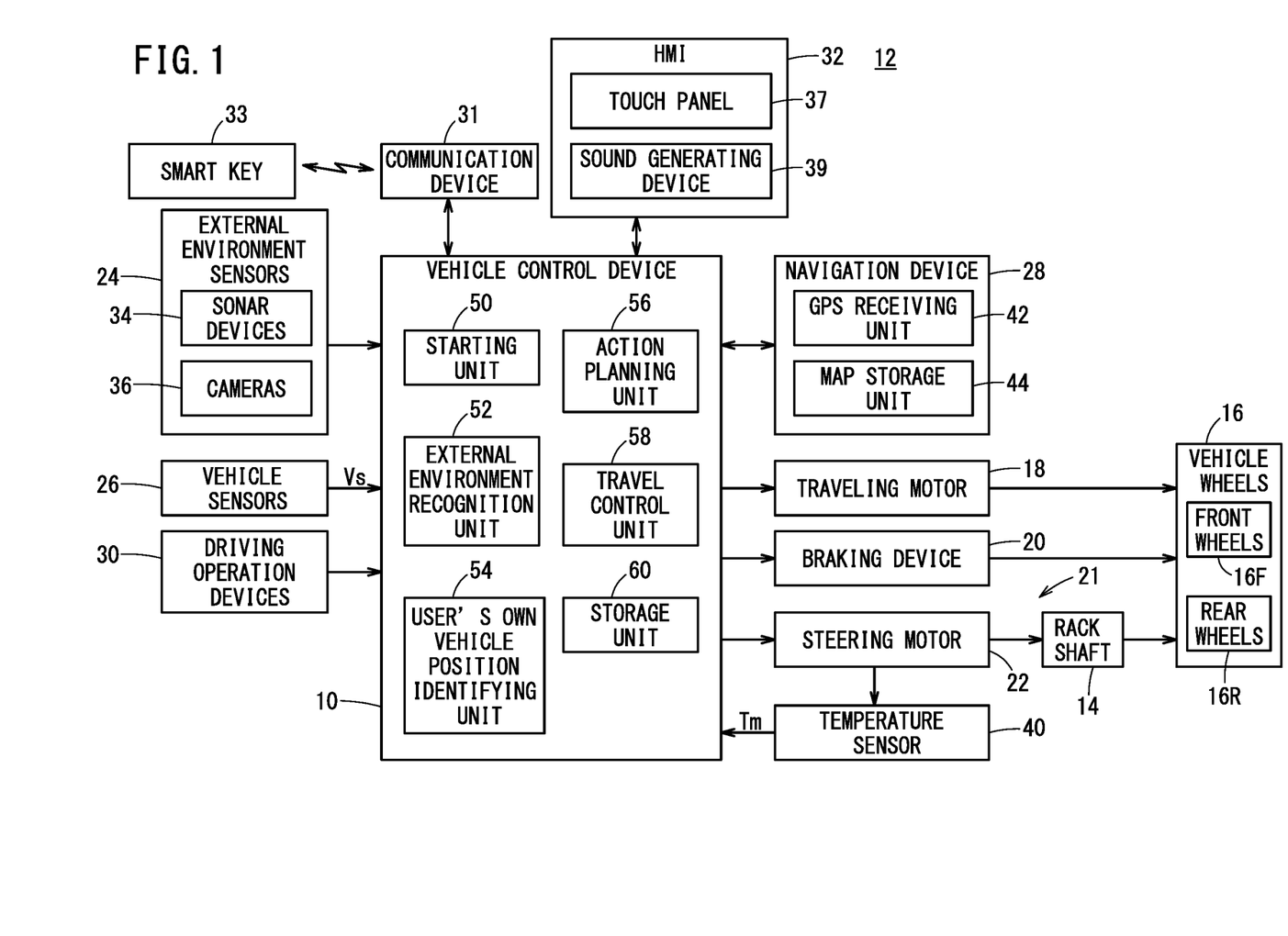
FIG. 1 is a block diagram showing an exemplary configuration of a vehicle equipped with a vehicle control device according to an embodiment.

FIG. 1 is a block diagram showing an exemplary configuration of a four-wheeled vehicle (user's own vehicle) 12 equipped with a vehicle control device 10 according to an embodiment.

As shown in FIG. 1, in addition to the vehicle control device 10, the vehicle 12 includes wheels (steerable front wheels 16F, and rear wheels 16R serving as drive wheels) 16, wherein the left and right front wheels are steered through a rack shaft 14.

As constituent elements connected to the vehicle control device 10, the vehicle 12 is further equipped with a traveling motor (propulsion device) 18, a braking device 20, a steering motor 22, external environment sensors 24, vehicle sensors 26, a navigation device 28, driving operation devices 30, a communication device 31, and an HMI (Human Machine Interface) 32.

The constituent elements connected to the vehicle control device 10 are capable of transmitting signals mutually to each other by a communication line such as a CAN (Controller Area Network).

The traveling motor 18 applies a propulsive force (a forward force or a rearward force) to the vehicle wheels 16 (the front wheels 16F and/or the rear wheels 16R), and thereby causes the vehicle 12 to travel. Moreover, although the vehicle 12 according to the present embodiment is an electric automobile (including a fuel cell vehicle) which is powered by a battery, the vehicle 12 may be an internal combustion engine automobile in which an internal combustion engine and a transmission are used instead of the traveling motor 18, or may be a hybrid vehicle in which both the internal combustion engine and the traveling motor 18 are used.

The braking device 20 is a device that applies a braking force to the vehicle wheels 16 (the front wheels 16F and/or the rear wheels 16R), and includes, for example, brake calipers that serve to press pads against brake discs, and an electric cylinder that supplies hydraulic pressure to the brake calipers. The braking device 20 may include an electric parking brake device (EPB) that regulates the rotation of the vehicle wheels 16.

The steering motor 22 includes a pinion on a main shaft, and forms a rack and pinion mechanism together with the rack shaft 14, and by applying an axial force (referred to as a rack axial force, or simply, an axial force or a steering axial force) to the rack shaft 14 which extends in the vehicle widthwise direction, the steering motor 22 applies a steering angle (turning angle) to the vehicle wheels 16 (the front wheels 16F). In this instance, the steering motor 22, the pinion, and the rack shaft 14, which are provided in order to change the steering angle of the vehicle wheels 16 (the front wheels 16F), form a steering system 21. Moreover, the steering system 21 may be provided with a transmission mechanism that boosts the rotational driving force (motor driving force) of the main shaft of the steering motor 22.

The traveling motor 18, the braking device 20, and the steering motor 22 are controlled by the vehicle control device 10.

The external environment sensors 24 include sonar devices 34 and cameras 36. The external environment sensors 24 may also include a millimeter wave radar device or a laser LiDAR device.

The external environment sensors 24 output detection results (external environmental information) to the vehicle control device 10.

The sonar devices 34 are ultrasonic sensors, which emit ultrasonic waves around the periphery of the vehicle 12, and by capturing reflected waves therefrom, serve to detect the position of peripheral objects outside of the vehicle 12 (including a parking space in terms of distance and direction). A plurality of such sonar devices 34 are provided respectively on a rear portion and a front portion of the vehicle 12. According to the present embodiment, the sonar devices 34 are provided in two pairs on the rear bumper, in two pairs on the front bumper, and in one pair on each of the front and rear ends of the left and right side surfaces of the vehicle 12, thus providing a total of six pairs.

The sonar devices 34 provided on the rear bumper primarily serve to detect the positions of objects behind the vehicle 12. The sonar devices 34 provided on the front bumper primarily serve to detect the positions of objects in front of the vehicle 12. The sonar devices 34 provided on the front end left and right side surfaces of the vehicle 12 serve to detect the positions of objects on the left and right outer sides, respectively, of the front end of the vehicle, whereas the sonar devices 34 provided on the rear end left and right side surfaces of the vehicle 12 serve to detect the positions of objects on the left and right outer sides, respectively, of the rear end of the vehicle. By the sonar devices 34 provided on the front end left and right side surfaces and the rear end left and right side surfaces, it is possible to detect a parking space {if the parking space is U-shaped, the opening length (width) and the depth thereof} positioned on a side surface of the vehicle 12.

The cameras 36 are devices that capture images of the surrounding periphery of the vehicle 12. The cameras 36 include a front camera that captures images of the front of the vehicle 12, and a rear camera that captures images of the rear of the vehicle 12. The cameras 36 may be provided in the vicinity of locations of the vehicle 12 where the door mirrors are installed, and may include a pair of left and right door mirror cameras which capture images of the left and right rear sides of the vehicle 12.

The cameras 36 may further include a pair of left and right pillar cameras provided on center pillars (B pillars), and which capture images of the left and right outer sides of the vehicle 12. By the cameras 36, it is possible to detect the parking space, and further, it is possible to cause an image of the vicinity in which the parking space is included to be displayed on a touch panel (parking space selection unit) 37 which also serves as a display unit (display) of the HMI 32.

The vehicle sensors 26 include a vehicle speed sensor that detects a speed (vehicle speed Vs) of the vehicle 12, an acceleration sensor that detects an acceleration, a yaw rate sensor that detects an angular velocity about a vertical axis, and an orientation sensor that detects an orientation of the vehicle 12.

Moreover, the vehicle sensors 26 also include a temperature sensor 40 for which a block is drawn separately therefor in order to facilitate understanding. The temperature sensor 40 detects, as a temperature (motor temperature) Tm of the steering motor 22, the temperature of a winding (copper winding) of the steering motor 22, and outputs the detected temperature to the vehicle control device 10.

The communication device 31 mediates wireless communications between the vehicle control device 10 and a smart key (portable device) 33.

The navigation device 28 is a device that acquires a current position of the vehicle 12, and carries out route guidance to a destination. The navigation device 28 includes a GPS receiving unit (positioning sensor) 42, and a map storage unit 44. The GPS receiving unit 42 identifies a position (latitude and longitude) of the vehicle 12 based on signals received from an artificial satellite (positioning satellite).

The map storage unit 44 is made up from a well-known type of storage device such as a hard disk or the like, and includes map information recorded therein.

The driving operation devices 30 are provided in the vehicle interior, and receive input operations performed by the vehicle occupant in order to control the vehicle 12.

The driving operation devices 30 include a steering wheel, an accelerator pedal, a brake pedal, a shift lever, and a power switch (push start switch). The power switch receives an input operation from the vehicle occupant in order to start the vehicle 12.

Moreover, the vehicle 12 is an electric vehicle the power source of which is a battery (including a fuel cell).

According to the present embodiment, a propulsive force by the traveling motor 18, a steering force by the steering motor 22, and a braking force by the braking device 20 are generated using a so-called "by wire" method.

The driving operation devices 30 may further include a switch for operating an electric parking brake device.

Each of the driving operation devices 30 includes an operation amount sensor which detects the positions of switches (including ON and OFF) and analog operation amounts, and outputs to the vehicle control device 10 signals (switch position and operation amount signals) indicative of operations thereof.

The HMI 32 notifies the vehicle occupant of various information by way of display or voice, together with accepting input operations made by the vehicle occupant. The HMI 32 includes the touch panel 37 that also serves as a display unit which accepts the input operations, and a sound generating device 39 such as a buzzer, a speaker, or the like. Moreover, the HMI 32 may be used as a display and audio device which also serves as a touch panel. Further, the HMI 32 may be configured by using a portion of the functions of the navigation device 28.

The vehicle control device 10 is an electronic control device (ECU) which includes a CPU, a ROM, a RAM, and the like. The vehicle control device 10 includes functional units which execute various vehicle controls, by the CPU carrying out arithmetic processing in accordance with programs. The vehicle control device 10 may also be configured in the form of hardware.

The vehicle control device 10 includes a function of automatically causing the vehicle 12 to be parked in a parking space.

In order to perform the automated parking control, the vehicle control device 10 includes respective functional units such as a starting unit 50, an external environment recognition unit 52, a user's own vehicle position identifying unit 54, an action planning unit 56, and a travel control unit 58, and a storage unit 60.

Based on a signal from the power switch among the driving operation devices 30, the starting unit 50 carries out authentication of the smart key 33, and determines whether the smart key 33 is inside the vehicle. When the smart key 33 is authenticated, and the smart key 33 is determined to be inside the vehicle, the starting unit 50 enables driving of the traveling motor 18 and the steering motor 22 by the travel control unit 58. Further, when the automated parking button, which is displayed on the touch panel 37 of the HMI 32, is placed in an ON state, and a parking space, which is also displayed on the touch panel 37, is selected, the starting unit 50 causes the automated parking control to be initiated by the action planning unit 56.

Based on the detection results of the external environment sensors 24, the external environment recognition unit 52 recognizes obstacles, for example, parked vehicles, stopped vehicles, rocks, walls, and enclosures that exist around the periphery of the vehicle 12, and acquires information such as the positions and sizes of the obstacles.

Further, on the basis of a well-known image analysis method such as pattern matching or the like, the external environment recognition unit 52 analyzes the images acquired by the cameras 36, and acquires information concerning the presence or absence of obstacles and their sizes.

Furthermore, the external environment recognition unit 52 calculates distances to the obstacles using signals from the sonar devices 34, and acquires the positions of the obstacles, and as a result, acquires a size (area) of a parking space.

The user's own vehicle position identifying unit 54 detects the position of the vehicle 12, based on signals from the GPS receiving unit 42 of the navigation device 28.

Further, in addition to the signals from the GPS receiving unit 42, the user's own vehicle position identifying unit 54 may acquire the vehicle speed Vs and the yaw rate from the vehicle sensors 26, and may specify the position and attitude of the vehicle 12 using so-called inertial navigation.

The external environment recognition unit 52 analyzes the detection results of the external environment sensors 24, and more specifically, the images captured by the cameras 36 based on a well-known image analysis method such as pattern matching or the like, and is capable of acquiring a parking space, for example, from the positions of white lines drawn on a road surface such as that of a parking lot or the like.

Based on a travel control instruction including a movement path (including a movement path for automated parking) from the action planning unit 56, the travel control unit 58 controls the traveling motor 18, the braking device 20, and the steering motor 22, and thereby causes the vehicle 12 to travel.

The storage unit 60 is constituted by a RAM and a ROM (including a rewritable non-volatile memory), and stores information required for processing by the action planning unit 56 and the travel control unit 58.

When there is an input from the vehicle occupant to the HMI 32, as necessary, the action planning unit 56 calculates a trajectory which becomes a movement path for the vehicle 12 (including the movement path for automated parking), and outputs the travel control instruction to the travel control unit 58.

Figure 2A:
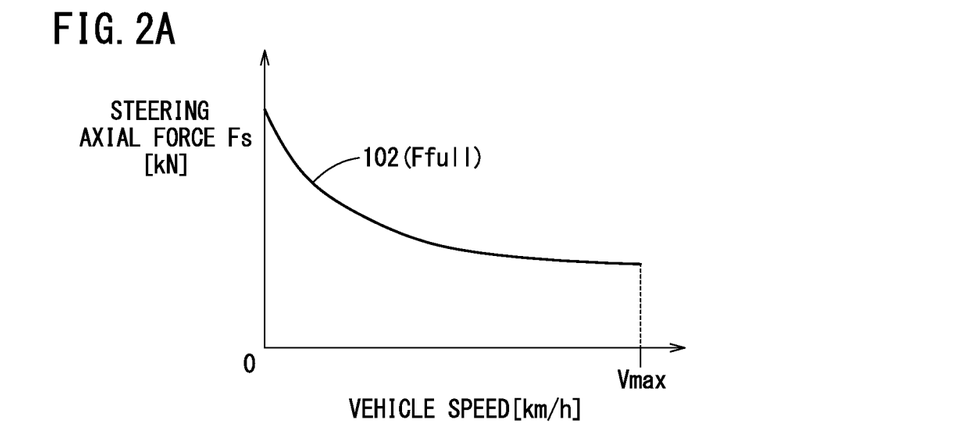
FIG. 2A is a characteristic diagram showing a vehicle speed characteristic of a full steering axial force.

In FIG. 2A, the horizontal axis represents the vehicle speed Vs [km/h] and the vertical axis represents the steering axial force Fs [kN], and there is shown a vehicle speed characteristic 102 of a full steering axial force Ffull [kN] which is applied to an automated parking control process, and which is recorded in advance according to the vehicle type in the storage unit 60.

The full steering axial force Ffull at a time of stationary steering becomes maximum, due to the fact that the friction applied to the tires of the vehicle wheels 16 (in particular, the front wheels 16F) is maximally large when the vehicle speed Vs when the vehicle is stopped is Vs=0 [km/h]. The full steering axial force Ffull has a characteristic in which it decreases sharply when the vehicle speed Vs increases from Vs=0 at a time when the vehicle is stopped, thereafter it gradually decreases as the vehicle speed Vs increases, and it becomes substantially constant when the vehicle speed Vs exceeds a maximum vehicle speed Vmax during traveling while performing automated parking, which is on the order of several [km/h].

Moreover, although the characteristic 102 of the full axial steering force Ffull [kN] moves up and down (generally moves in a parallel manner) on the vertical axis depending on the coefficient of friction between the tires and the road surface, in FIG. 2A and in FIG. 2C described below, the vehicle speed characteristic 102 of the full steering axial force Ffull [kN] is set to a characteristic of being on a dry road surface (a road surface with a high coefficient of friction), in consideration of a worst case in which the full steering axial force Ffull [kN] is maximally large. Setting of the characteristic may be changed by detecting a road surface condition such as a dry road surface, a wet road surface, or the like.

Figure 2B:
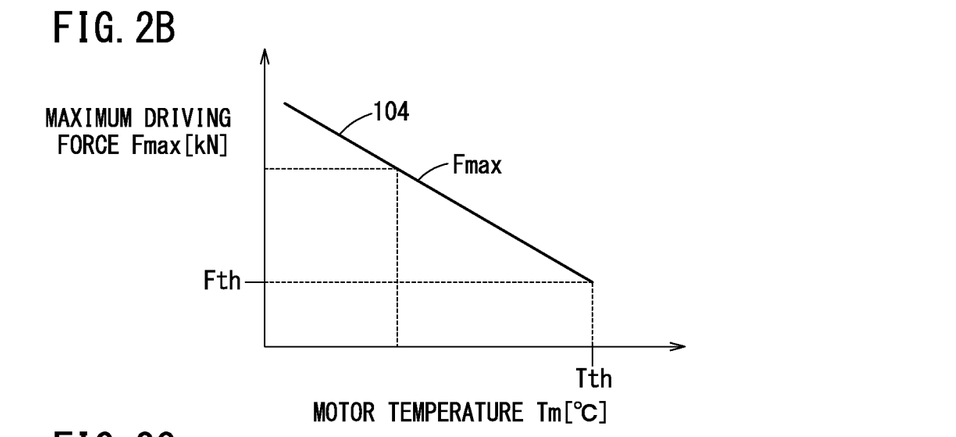
FIG. 2B is a maximum driving force motor temperature characteristic diagram.

In FIG. 2B, there is shown a motor temperature characteristic 104 of a maximum driving force (rated driving force) Fmax [kN] that can be applied to the rack shaft 14 by the steering motor 22. As the motor temperature Tm [° C.] becomes higher, the resistance value of the winding (copper winding) becomes higher, whereby, at the same rating (electric power), the current that can be passed through the steering motor 22 becomes smaller, and a characteristic is exhibited in which the maximum driving force Fmax that can be applied to the rack shaft 14 by the steering motor 22 decreases.

Figure 2C:
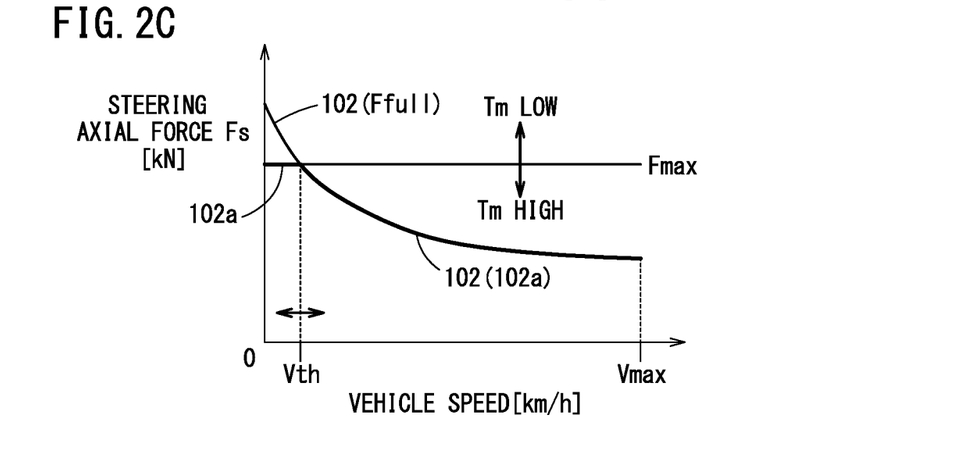
FIG. 2C is a characteristic diagram providing a description in which the maximum driving force motor temperature characteristic shown in FIG. 2B is superimposed on the vehicle speed characteristic of the full axial steering force shown in FIG. 2A.

FIG. 2C is a characteristic diagram showing the motor temperature characteristic 104 of the maximum driving force Fmax of the steering motor 22 shown in FIG. 2B, and which is superimposed on the vehicle speed characteristic 102 of the full axial steering force Ffull shown in FIG. 2A.

As shown in FIG. 2C, the value of the maximum driving force Fmax moves up and down on the vertical axis of FIG. 2C in proportion to the height of the motor temperature Tm.

As can be understood from FIG. 2C, in a region where the vehicle speed Vs ranges from Vs=0 at which the load on the steering system 21 (steering motor 22) becomes maximally large to Vs=threshold vehicle speed Vth, the full steering axial force Ffull [kN] exceeds the maximum driving force Fmax of the steering motor 22 having a small rating.

Thus, as shown in FIG. 2C, at or below the threshold vehicle speed Vth where the characteristic 102 of the full steering axial force Ffull and the maximum driving force Fmax intersect, the full steering axial force Ffull is limited to a characteristic (limited vehicle speed characteristic) 102a which is drawn by the thick solid line and limited to the maximum driving force Fmax of the steering motor 22.

Operations

Figure 3:
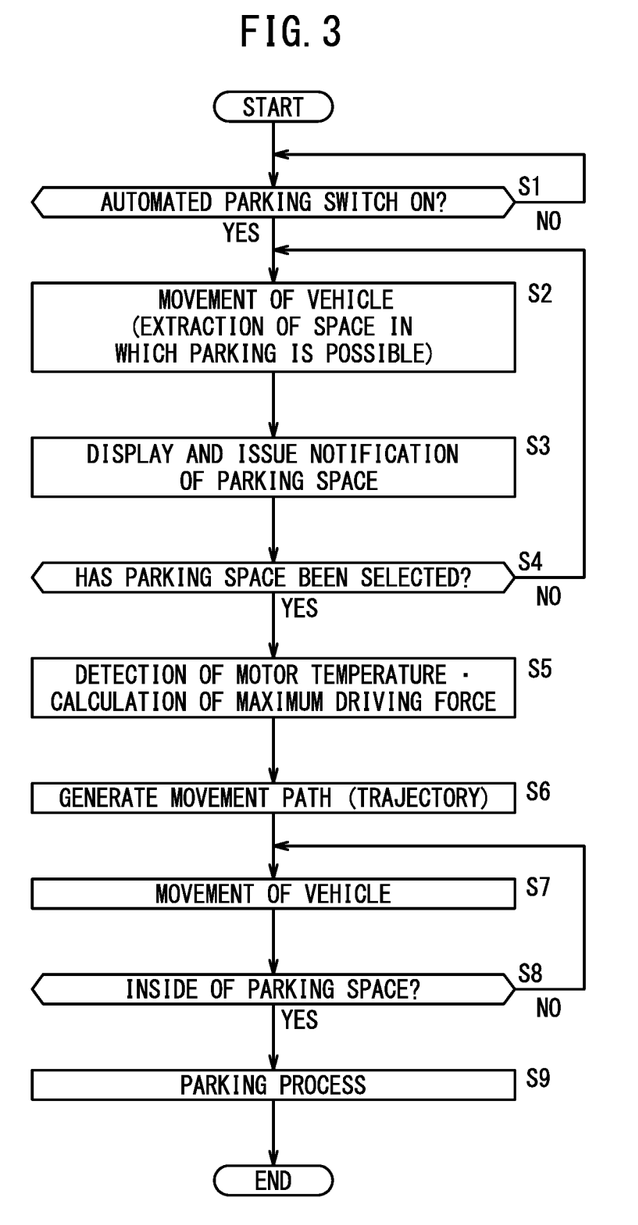
FIG. 3 is a flowchart provided to explain an operation of generating a parking movement path in the vehicle control device according to the embodiment.

Basically, operations of the automated parking process of the vehicle control device 10, which is configured in the manner described above, will be described with reference to the flowchart shown in FIG. 3. The execution subject of the program according to the flowchart is the vehicle control device 10 (in particular, the action planning unit 56).

In step S1, the action planning unit 56 determines whether or not an ON operation (an operation of touching the automated parking button by the vehicle occupant) has been performed on the HMI 32.

Normally, the vehicle occupant performs the ON operation on an automated parking switch icon which is displayed on the touch panel 37 of the HMI 32, at a time when the vehicle 12 stops when having entered a parking lot at the destination, or at a time when the vehicle 12 stops when having come in proximity to the parking lot.

When the action planning unit 56 detects the ON operation of the automated parking switch (step S1: YES), the action planning unit 56 initiates the automated parking process.

Figure 4:
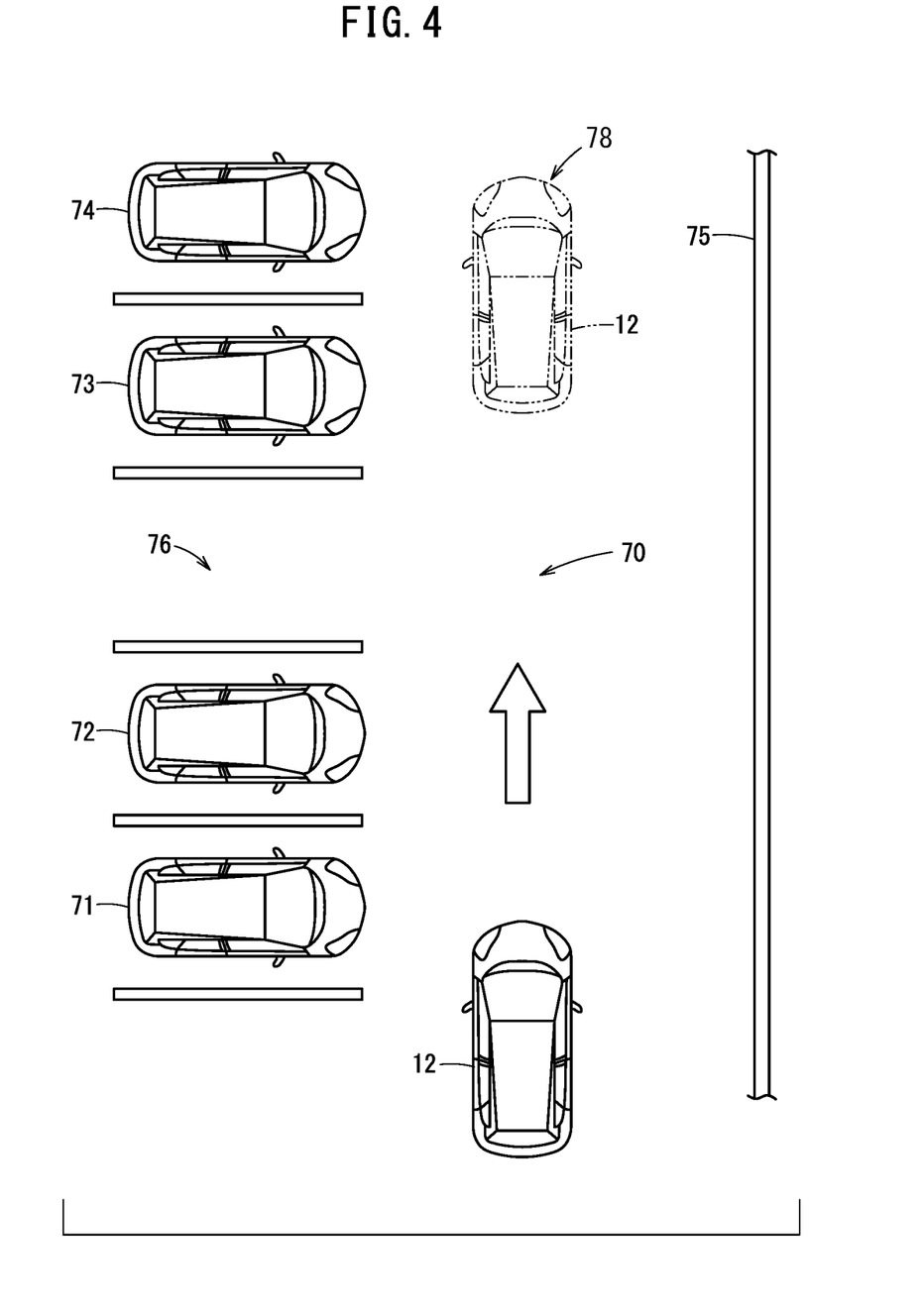
FIG. 4 is a schematic plan view showing a positional relationship when a vehicle while being stopped searches for a parking space (a space in which parking is possible)

FIG. 4 is a schematic plan view showing a positional relationship when the vehicle (user's own vehicle) 12, while being stopped at a position where the ON operation has been performed on the automated parking switch, searches for a parking space (a space in which parking is possible) 76.

In step S2, the action planning unit 56 searches for and extracts a space (parking space) in which parking is possible. For this purpose, through the travel control unit 58, the action planning unit 56 causes the vehicle 12 to travel straight ahead on a road 70 in the direction of the arrow. In addition, while the travel control unit 58 is causing the vehicle 12 to travel straight ahead, the action planning unit 56 determines, on the basis of signals from the external environment sensors 24, the positions and sizes of obstacles (vehicles 71 to 74 and an enclosure 75 such as a wall or the like), and the positions of white lines drawn on the road surface of the road 70.

Figure 5:
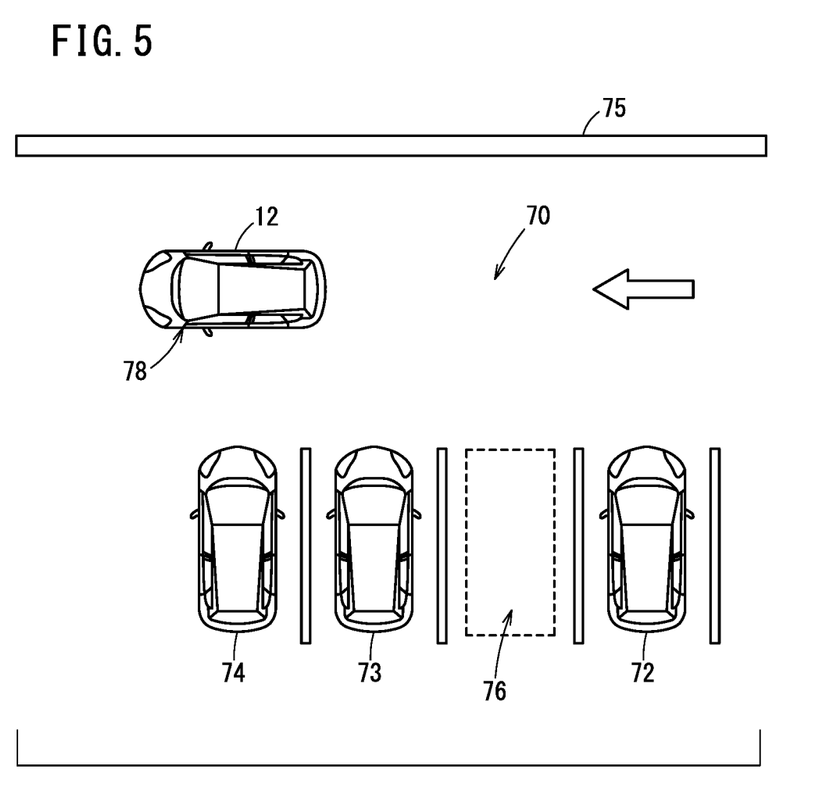
FIG. 5 is a schematic plan view showing a state in which a vehicle which is intended to be parked automatically is stopped at a starting position of a parking movement path.

Then, as shown in FIG. 5, the action planning unit 56, via the travel control unit 58, causes the vehicle 12, which has passed a parking space 76, to come to a stop at a predetermined position (starting position of a parking movement path) 78.

In this case, the action planning unit 56 extracts the space in which parking is possible (hereinafter referred to as a parking space) 76, based on the position and size of the acquired obstacles (the vehicles 71 to 74) and the white lines.

Next, in step S3, the action planning unit 56 displays a schematic plan view (in general, the schematic image shown in FIG. 5) including the parking space 76 on the HMI 32 (the touch panel 37), and a notification is issued to the vehicle occupant through the sound generating device 39 to the effect that a parking space 76 exists. At this time, the action planning unit 56 may display on the touch panel 37 an image acquired by the cameras 36, by converting the coordinates thereof into a planar image, and superimposing the image.

Next, in step S4, when the parking space 76 is selected by a touch operation of the vehicle occupant on the HMI 32 (the touch panel 37) which functions as a parking space selection unit (step S4: YES), the HMI 32 (touch panel 37) outputs, to the action planning unit 56, a signal corresponding to the input parking space 76, whereupon the process proceeds to step S5. Moreover, if selection of the parking space 76 is denied or answered negatively (step S4: NO), the processes of step S2 and thereafter are repeated until a parking space 76 is selected.

When the parking space 76 is selected, then in step S5, prior to calculating the parking movement path (also simply referred to as a movement path) in step S6, the action planning unit 56 obtains the maximum driving force Fmax of the steering motor 22 depending on the motor temperature Tm. More specifically, after having detected, through the temperature sensor 40, the motor temperature Tm [° C.], which is the temperature of the steering motor 22, the action planning unit 56 calculates the current maximum driving force Fmax [kN] of the steering motor 22 (at the detected motor temperature Tm [° C.]) with reference to the motor temperature characteristic 104 shown in FIG. 2B which is recorded in the storage unit 60.

In this manner, the current maximum driving force Fmax [kN] of the steering motor 22 depends on the motor temperature Tm, which is based on, for example, the outside air temperature when the vehicle 12 is stopped at the predetermined position 78, and the operating state of the steering motor 22 until the vehicle comes to a stop at the predetermined position 78.

Moreover, in FIG. 2B, the threshold temperature Tth [° C.] on the motor temperature Tm [° C.] axis is a maximum permissible temperature (rated temperature) of the steering motor 22, and the steering motor 22 is driven in a manner so that the motor temperature Tm [° C.] does not exceed the threshold temperature Tth [° C.].

Next, in step S6, the action planning unit 56 generates (calculates) the movement path (trajectory) from the current position (predetermined position 78) of the vehicle 12, which is the starting position of the parking movement path, to the inside of the parking space 76, which is the ending position of the parking movement path. The calculated movement path is preferably displayed on the touch panel 37.

Figure 6A:
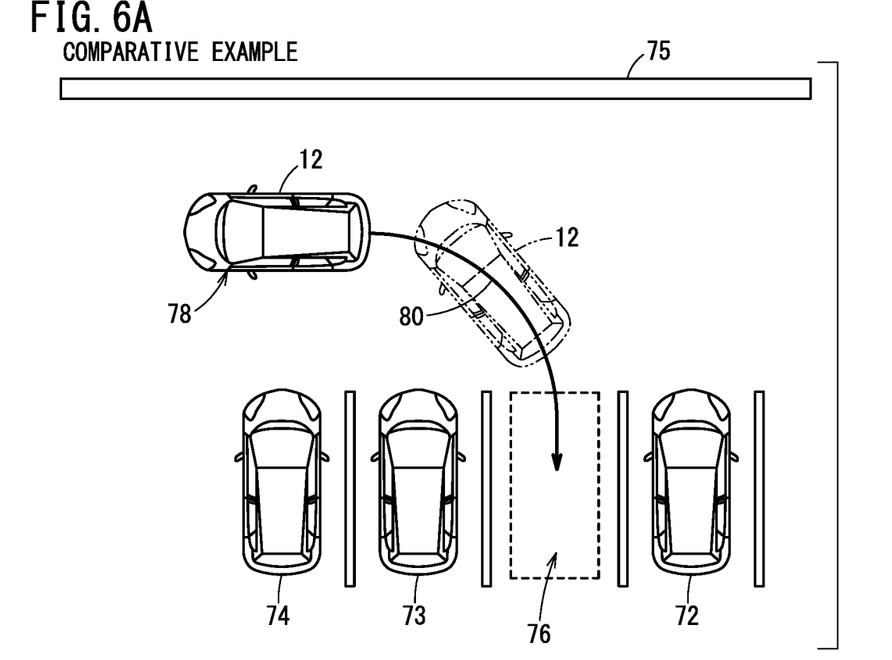
FIG. 6A is a schematic plan view for explaining a movement path, which is generated by a vehicle control device according to a comparative example, from a starting position of a parking movement path to an ending position of a parking space.

FIG. 6A is a schematic plan view for explaining a movement path 80, which is generated by a vehicle control device according to a comparative example, from a predetermined position (starting position of the parking movement path) 78. In this instance, the predetermined position 78 where the vehicle 12 is stopped is a position (starting position of parking) on the movement path (rearward trajectory) 80 (see FIG. 6A) at which the vehicle 12, which is equipped with a steering motor having a larger rating (maximum driving force Fmax) in comparison with the steering motor 22 of the embodiment, is fitted into the parking space 76 with a minimum turning radius of the rear wheels 16R of the vehicle 12 when the vehicle 12 performs stationary steering {full steering of the front wheels 16F in a leftward direction is performed when the vehicle is stopped (vehicle speed Vs=0 [km/h]} at the predetermined position 78. More specifically, the parking movement path 80 of the comparative example is set such that the vehicle is fitted into the parking space 76 without turning back (switching back in an opposite direction) even once from the predetermined position 78.

However, if the vehicle 12 of the embodiment, which is equipped with the steering motor 22 having a relatively small rating, attempts to travel along the parking movement path 80 of the comparative example, then as shown in FIG. 2C, the full steering axial force Ffull for performing stationary steering of the front wheels 16F at a vehicle speed Vs of less than or equal to the threshold vehicle speed Vth is in excess of the maximum driving force Fmax that can be generated by the rating of the steering motor 22. In this case, if the steering motor 22 were to be driven with a power which is greater than or equal to its rating in an attempt to make the front wheels 16F undergo full steering, there is a possibility that the motor temperature Tm would rise beyond the rated temperature, and cause the steering motor 22 to deteriorate.

Figure 6B:
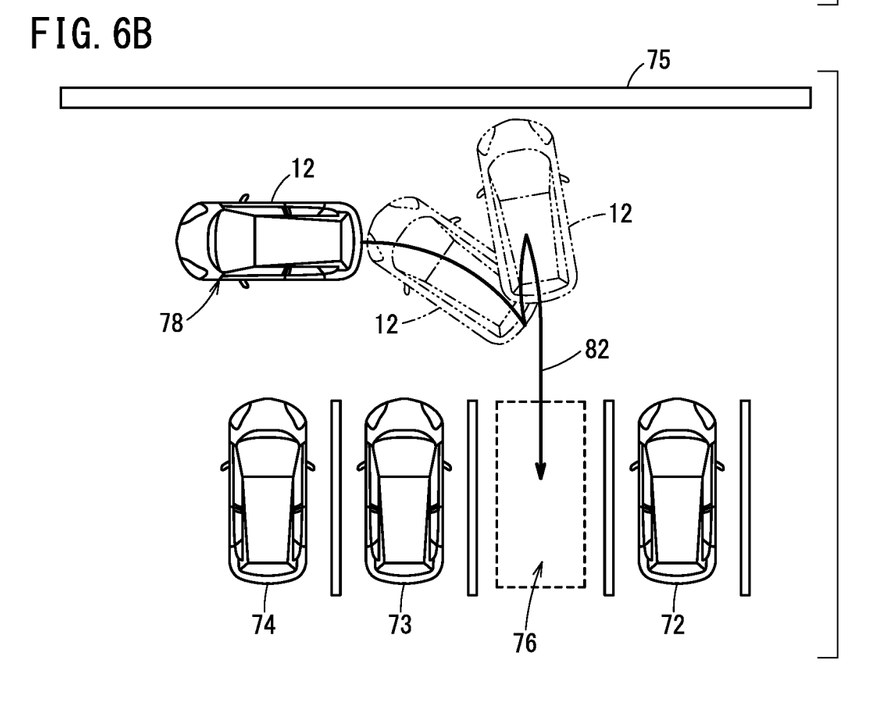
FIG. 6B is a schematic plan view for explaining a movement path, which is generated by a vehicle control device according to the embodiment, from a starting position of a parking movement path to an ending position of a parking space.

In order to avoid this situation, according to the present embodiment, as shown in FIGS. 1, 2C, and 6B, the action planning unit 56 suppresses the driving force of the steering motor 22 to remain at the maximum driving force Fmax or less than or equal to the maximum driving force Fmax, from a point at which the vehicle speed Vs is Vs=0 (at the predetermined position 78) until the vehicle speed Vs becomes in excess of the threshold vehicle speed Vth (the threshold vehicle speed Vth at which the full steering axial force Ffull becomes equivalent to the maximum driving force Fmax).

Consequently, a movement path 82 is generated in which movement (traveling) is initiated at the predetermined position (the starting position of the parking movement path) 78 without full steering, and thereafter, rearward parking in the parking space 76 is made possible by turning back (switching back in the opposite direction) one time. The movement path 82 includes full steering by the steering motor 22 when the vehicle speed Vs during traveling has exceeded the threshold vehicle speed Vth.

More specifically, according to the present embodiment, the heated state of the steering motor 22 constituting the steering system 21 is detected by the temperature sensor 40. The maximum driving force Fmax that is capable of being output at the motor temperature Tm [° C.] detected by the temperature sensor 40 is calculated (see FIG. 2B), and the steering axial force Fs [kN] at a time when the vehicle speed Vs is Vs=0 [km/h], at which a high load is applied to the steering motor 22, is set to a value less than the maximum driving force Fmax.

In this manner, when the vehicle 12 according to the present embodiment is automatically parked, stationary steering (full steering when the vehicle is stopped) is avoided, and the ratio of steering during traveling (which may include full steering during traveling), for which the load is low even if the number of times that turning back (switching back in an opposite direction) increases, is increased, whereby it is possible to prevent a situation in which traveling is prohibited due to overheating of the steering motor 22 during the automated parking control on the set movement path.

In step S7, the travel control unit 58 controls the traveling motor 18, the braking device 20, and the steering motor 22 along the movement path 82 (see FIG. 6B) that was generated by the action planning unit 56 in step S6, and thereby controls traveling of the vehicle 12. In step S8, when it is determined that the vehicle 12 has moved inside the parking space 76 (has reached the end position of the parking movement path 82) (step S8: YES), the vehicle 12 is made to stop.

Figure 7A:
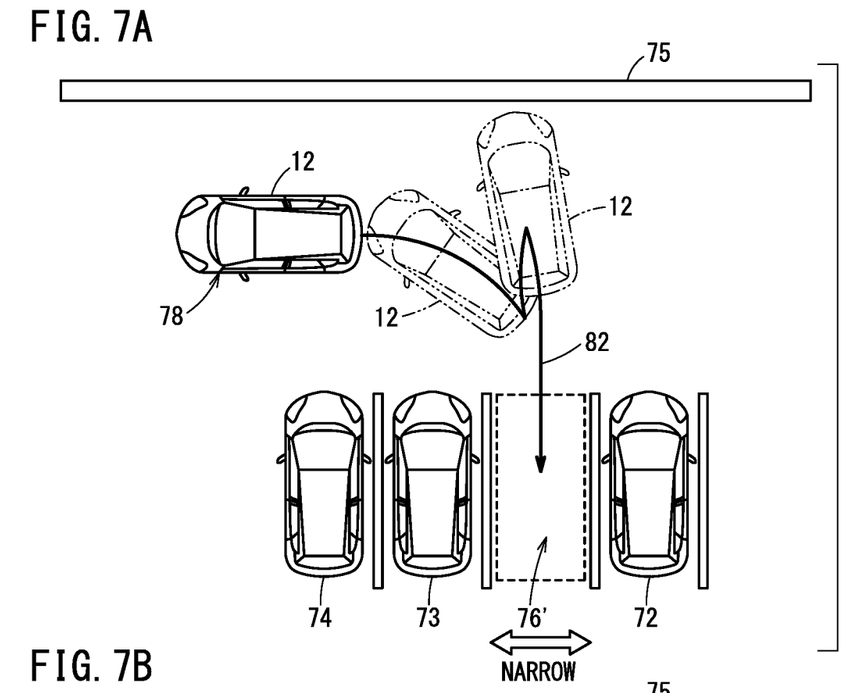
FIG. 7A is a schematic plan view for explaining a movement path, which is generated by a vehicle control device according to the embodiment, from a starting position of a parking movement path to an ending position of a narrow parking space.

In this case, as shown in FIG. 7A, with the vehicle control device 10 according to the embodiment, by controlling traveling of the vehicle 12 along the movement path 82 (a movement path from the predetermined position 78, which is the starting position of parking, to an ending position of parking, which is the position of a parking space 76' having a narrow opening) in which turning back (switching back in an opposite direction) is included, parking is possible even in such a narrow parking space 76'.

Figure 7B:
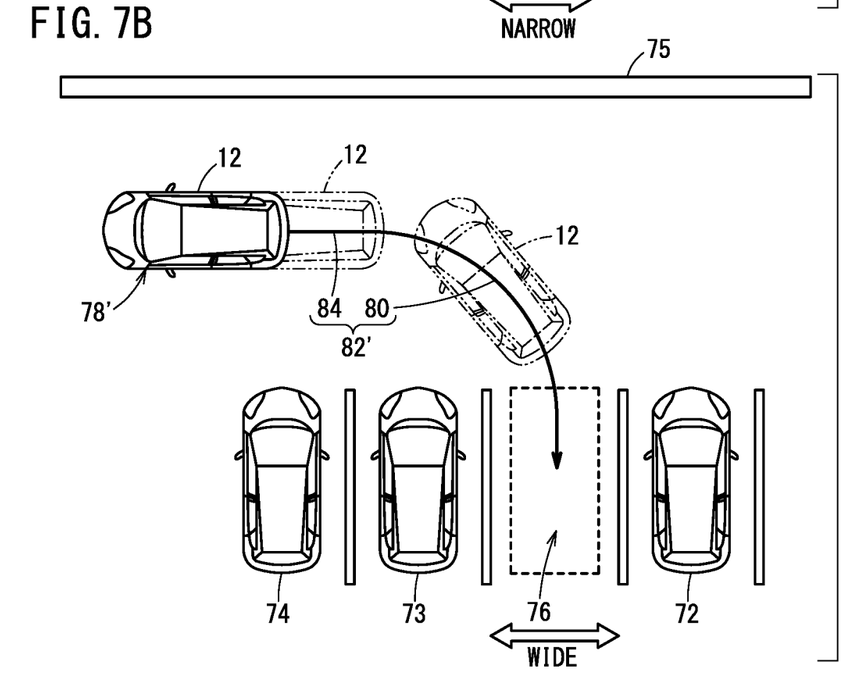
FIG. 7B is a schematic plan view for explaining another movement path, which is generated by a vehicle control device according to the embodiment, from another starting position of a parking movement path to an ending position of a wide parking space.

Moreover, as shown in FIG. 7B, similar to FIGS. 6A and 6B, in the case of parking in a wide parking space 76, the action planning unit 56 advances the vehicle 12 beforehand to another predetermined position 78' which is slightly advanced from the predetermined position 78 and causes the vehicle 12 to come to a stop, and such a position is set as a starting position of rearward parking.

In this manner, in the case that the starting position is set beforehand to the predetermined position 78' which is more advanced than the predetermined position 78, in a new parking movement path 82', a rearward movement travel path 84 for approaching is set in order to increase the vehicle speed Vs from Vs=0 (the vehicle speed at the predetermined position 78') to Vs=Vth (the vehicle speed at the predetermined position 78) by traveling rearward while progressing in a straight line to the predetermined position 78 (in this case, the predetermined position 78 becomes a pass-through position). Furthermore, the movement path 82' is set such that the movement path (rearward trajectory) 80, by which the vehicle 12 is fitted into the parking space 76 with a minimum turning radius of the rear wheels 16R of the vehicle, is connected in series to the rearward movement travel path 84.

Along the movement path 82', on the movement path 80 after the predetermined position 78, the vehicle 12 is made to undergo full steering with a full steering axial force Ffull which is less than the maximum driving force Fmax of the steering motor 22, and the vehicle 12 is caused to be parked in the parking space 76.

After movement to the parking space 76 is completed, then in step S9, the action planning unit 56 performs a parking process for causing the vehicle 12 to be parked. In such a parking process, the action planning unit 56 drives the braking device 20 through the travel control unit 58.

Thereafter, the action planning unit 56 activates a non-illustrated electric parking brake through the travel control unit 58. In this manner, when stopping of the vehicle 12 is completed, the action planning unit 56 performs a display on the touch panel 37 of the HMI 32 to indicate that parking has been completed, together with issuing a notification to the vehicle occupant through the sound generating device 39 to the effect that parking has been completed.

Thereafter, the vehicle occupant exits the vehicle, and locks the vehicle using the smart key 33.

Inventions that can be Grasped from the Embodiment

In this instance, the inventions that can be grasped from the above-described embodiment will be described below. Although to facilitate understanding, the constituent elements are designated by the reference numerals used in the above-described embodiment, the constituent elements are not limited to those elements to which such reference numerals are applied.

The vehicle control device 10 according to the present invention causes the user's own vehicle 12 to be automatically parked inside the parking space 76 or 76', based on outputs of the external environment sensors 24 provided in the user's own vehicle 12, the vehicle control device 10 comprising the parking space selection unit 37 which selects the parking space 76 or 76', the action planning unit 56 which generates the parking movement path 80, 82, or 82' from the starting position of parking 78 or 78' to the position inside the selected parking space 76 or 76' selected, and the travel control unit 58 that controls the propulsion device 18 and the steering motor 22 along the generated movement path 80, 82, or 82', wherein the steering motor 22 generates a driving force based on a steering instruction from the travel control unit 58 and applies the steering axial force Fs to the rack shaft 14 to thereby cause the vehicle wheels 16 (the front wheels 16F) to be steered, and the action planning unit 56 generates the movement path 80, 82, or 82' to cause the user's own vehicle to initiate traveling by the steering motor 22 at the starting position of parking 78 or 78' and with the steering axial force Fs less than the full steering axial force Ffull.

In accordance with such a configuration, since the vehicle is made to initiate traveling without stationary steering (full steering during vehicle stoppage), automated parking can be carried out with the steering motor 22 having a small rating.

Further, in the vehicle control device 10 according to the present invention, the action planning unit 56 suppresses the steering axial force Fs, which causes traveling to be initiated at the starting position of parking 78 or 78' and which is less than the full steering axial force Ffull, to a steering axial force Fs that is capable of being generated at less than or equal to the maximum driving force Fmax of the steering motor 22.

In accordance with such a configuration, since the vehicle is made to initiate traveling at the starting position of parking 78 or 78' of the movement path 80, 82, or 82' with the steering axial force Fs being suppressed to the steering axial force Fs that is less than or equal to the maximum driving force Fmax of the steering motor 22, automated parking can be carried out with the steering motor 22 having a small rating.

In the vehicle control device 10, the action planning unit 56 generates the movement path 80, 82, or 82' in which full steering is included while traveling along the movement path 80, 82, or 82'.

In accordance with such a configuration, by causing traveling to be initiated without stationary steering (full steering during vehicle stoppage), the load on the steering motor 22 is reduced, and protection is provided in a manner so that the steering axial force (rack axial force) Fs does not exceed the maximum driving force Fmax of the motor, while on the other hand, since the movement path 80, 82, or 82' is generated in which full steering is included during traveling (Vs<Vth) when the full steering axial force Ffull is less than the maximum driving force Fmax of the motor, agile and rapid automated parking is made possible with the steering motor 22 having a small rating.

Further still, in the vehicle control device 10, the propulsion device is preferably the traveling motor 18.

In accordance with such a configuration, the power source for both the traveling motor 18 and the steering motor 22 is the electric power from the battery, and the rating of the battery (enlargement and an increase in weight thereof) can be suppressed. Further, such a configuration is gentle to the environment.

Further still, in the vehicle control device 10, full steering is prohibited in a region which is included in the movement path 80, 82, or 82' and in which the vehicle speed Vs is less than the threshold vehicle speed Vth at which the steering axial force Fs exceeds the maximum driving force Fmax of the steering motor 22.

In accordance with such a configuration, protection to suppress a rise in temperature of the steering motor 22 is reliably ensured.

The present invention is not limited to the above-described embodiment, but it goes without saying that various additional or alternative configurations could be adopted therein based on the content disclosed in the present specification.

What is claimed is:

1. A vehicle control device configured to cause a user's own vehicle to be automatically parked inside a parking space, based on outputs of external environment sensors provided in the user's own vehicle,
the vehicle control device comprising one or more processors that execute computer-executable instructions stored in a memory,
wherein the one or more processors execute the computer-executable instructions to cause the vehicle control device to:
select the parking space;
generate a movement path for parking from a starting position of parking to a position inside the selected parking space; and
control a propulsion device and a steering motor along the generated movement path, and
wherein the steering motor generates a driving force based on a steering instruction from the vehicle control device and applies a steering axial force to a rack shaft to thereby cause vehicle wheels to be steered, and
the one or more processors cause the vehicle control device to generate the movement path to cause the user's own vehicle to initiate and continue traveling by the steering motor with a steering axial force less than a full steering axial force from the starting position of parking during vehicle stoppage at which a vehicle speed is zero until the vehicle speed becomes in excess of a threshold vehicle speed.

2. The vehicle control device according to claim 1, wherein the one or more processors cause the vehicle control device to suppress the steering axial force, which causes traveling to be initiated at the starting position of parking and which is less than the full steering axial force, to a steering axial force that is capable of being generated at less than or equal to a maximum driving force of the steering motor.

3. The vehicle control device according to claim 1, wherein the one or more processors cause the vehicle control device to generate the movement path in which full steering is included while traveling along the movement path.

4. The vehicle control device according to claim 1, wherein the propulsion device is a traveling motor.

5. The vehicle control device according to claim 1, wherein full steering is prohibited in a region which is included in the movement path and in which a vehicle speed is less than a predetermined vehicle speed at which the steering axial force exceeds a maximum driving force of the steering motor.

* * * * *